Nov. 29, 1955         H. S. JACOBS         2,725,511
POLYPHASE MOTOR SPEED CONTROL
Original Filed April 16, 1945
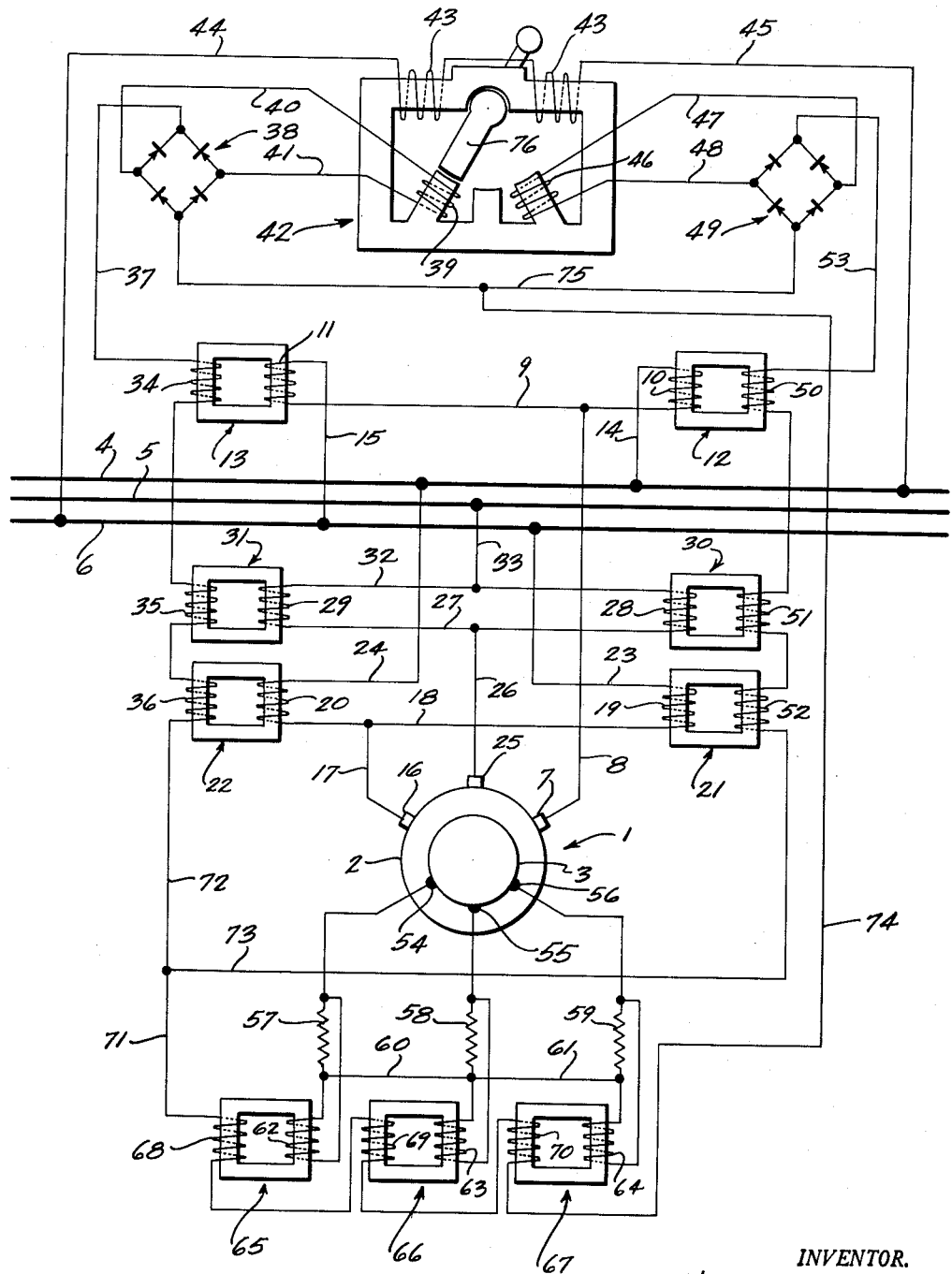
INVENTOR.
Henry S. Jacobs
BY David G. Fu
Attorney United States Patent Office 2,725,511
Patented Nov. 29, 1955

2,725,511

POLYPHASE MOTOR SPEED CONTROL

Henry S. Jacobs, Milwaukee, Wis., assignor to Harnischfeger Corporation, Milwaukee, Wis., a corporation of Wisconsin Original application April 16, 1945, Serial No. 588,685. Divided and this application May 19, 1951, Serial No. 227,157

2 Claims. (Cl. 318—202)

This invention relates to alternating current electric motor control and resides in an apparatus wherein the motor under operation remains permanently connected to a power source and the output of the motor is varied by alteration of the inductive reactance of control windings disposed in the motor circuit through regulation of exciting currents acting to alter the magnitude of magnetic flux disposed in paths linked with said control windings the exciting currents being derived if desired from rectifiers supplied by reactively regulatable sources of alternating current.

This application is a division of my co-pending application bearing Serial Number 588,685, filed on April 16, 1945, now Patent No. 2,559,538, and relates to that part of my invention pertaining to the speed regulation of alternating current motors.

In accordance with the present invention speed control and reversal through application of regulated voltage of the desired phase sequence to the input terminals of a motor is provided by inductive or reactive regulation of the motor circuits, permitting control of speed in either direction under suitable load conditions over a wide smooth stepless range without the need for resort to separation or engagement of switch contacts. Such control may be manipulated through the employment of simple manual means.

Inductively reactive circuit components have heretofore found use in the control of alternating current motors by introduction of the same into the motor primary circuits as a substitute for switching. The use of such circuits has facilitated automatic control systems and applications thereof have usually been interdependent with special regulating elements. Such control systems, however, have required the unbalancing of circuit conditions with resulting asymmetrical voltage relations at the motor terminals and uneven distribution of load on the power lines. Also, there has been resort to single phasing of the motor and to such complications as phase shifting to provide the desired results.

It is an object of this invention to provide a switchless inductive regulation for control of a polyphase alternating current motor that will provide for reversal in rotation and for speed control under suitable load conditions and yet maintain a balanced load upon the power lines for all conditions of operation and which will retain asymmetrical voltage relationship at the motor terminals.

It is another object of this invention to effectively join each of the power leads that form a portion of the control circuit to but one motor terminal for a given direction of rotation and to alter the effective connection of some of the power leads to other of the motor terminals for reversal of rotation by employment of inductive impedances that act to diminish current values to negligible amounts in certain power leads in response to a manual regulator that acts to alternatively affect the impedance values.

It is a further object of this invention to provide switchless inductive or reactive control of circuit conditions in the secondary circuit of the motor to be controlled. One particular form of such control in which the present invention may be embodied provides for regulation of reactive controls disposed in the secondary simultaneously with the reactive control devices operative upon the primary circuit of the motor, such simultaneous operation being carried on regardless of which of the alternate choices of rotation is selected.

It is still a further object of this invention to provide switchless inductive or reactive regulation of an induction motor having an external secondary circuit that provides for high torque during starting similar to a squirrel cage motor and for the insertion of impedance within the secondary circuit by smooth stepless operation to enhance speed control under suitable load conditions.

These and other objects will appear in the description to follow. In the description reference is made to the accompanying drawing which forms a part hereof and in which there is shown by way of illustration and not of limitation a form in which this invention may be embodied.

In the drawing there is shown a circuit diagram of an induction motor control system in which speed control and direction of rotation may be had in accordance with this invention.

Referring now to the drawing, there is shown therein a conventional three phase slip ring induction motor 1 having a stator 2 and a wound rotor 3. The necessary power for operating the motor 1 is supplied through the power mains 4, 5 and 6.

A terminal 7 of the motor 1 is connected by a lead 8 with a connecting lead 9 which joins with an end of each of the two reactor windings 10 and 11 mounted respectively upon saturation reactors 12 and 13. The opposite ends of the windings 10 and 11 are joined by leads 14 and 15 with the power mains 4 and 6 respectively. In this way two alternative admission paths for the supply of current to the terminal 7 are provided making it possible to establish the equivalent of direct connection from main 4 or 6 with the terminal 7. The saturation reactors 12 and 13 may be constructed with a three legged magnetic frame having the windings 10 and 11 each respectively divided to surround the two outside legs of its associated reactor frame in a manner to have the resultant fluxes cancel one another in the middle leg. This construction is well known in the art and in my co-pending application, Serial Number 588,685, there are shown three legged reactors of this construction. Other reactors, to be herein referred to and shown in the drawing, may be of like construction so as to minimize the transformer effects harmful to sources of direct current joined to one of the windings of each reactor.

In a similar fashion terminal 16 of motor 1 is connected by lead 17 with a connecting lead 18 that joins with an end of each of the two reactor windings 19 and 20 mounted respectively upon saturation reactors 21 and 22. The opposite ends of the windings 19 and 20 are joined respectively by leads 23 and 24 with power mains 6 and 4 respectively. In this way alternative admission paths between the mains 6 and 4 and the terminal 16 are provided.

A terminal 25 of the motor 1 is connected by a lead 26 to a connecting lead 27 that joins an end of each of the two windings 28 and 29 mounted respectively on saturation reactors 30 and 31. The opposite ends of the windings 28 and 29 are joined together by a lead 32 which is in turn connected by a lead 33 with the power main 5. While two admission paths are thus provided for the terminal 25 of the motor 1, the same are not alternative and are confined to a single connection with the main 5 for purposes to be more fully described hereinafter. The saturation reactors 13, 31 and 22 are arranged to be controlled by saturation coils 34, 35 and 36, the same being connected in series and joined at one end by means of a lead 37 with one output terminal of a rectifier 38. The rectifier 38 is arranged to be supplied with alternating current by an induction regulator winding 39 joined thereto by leads 40 and 41.

The winding 39 forms a part of an induction regulator 42 having an input winding 43 joined by leads 44 and 45 with the power mains 6 and 4 respectively. The induction regulator 42 also has another output winding 46 which is joined by leads 47 and 48 with the input terminals of a rectifier 49.

The saturation reactors 12, 30 and 21 are controlled by saturation windings 50, 51 and 52 which are connected in series and joined by a lead 53 with one output terminal of the rectifier 49. The return connections for the saturation windings of the saturation reactors are provided in a manner to be presently described.

In addition to the regulating means above described and associated in circuit with the primary or stator windings of the motor 1 regulating elements in circuit with the secondary or rotor windings may also be employed as illustrated in the drawing. As shown therein there are connected with slip ring terminals 54, 55 and 56 secondary resistors 57, 58 and 59 respectively. The resistors 57, 58 and 59 are joined at their outer ends to one another by leads 60 and 61. In shunt relationship with the resistors 57, 58 and 59 are impedance windings 62, 63 and 64 respectively, the same being mounted upon and as part of saturation reactors 65, 66 and 67.

Saturation reactors 65, 66 and 67 are provided with saturation windings 68, 69 and 70. The saturation windings 68, 69 and 70 are joined in series and connected at one end by means of lead 71 and leads 72 and 73 with the lower ends of the windings 36 and 52 respectively. In this way the windings 68, 69 and 70 provide a return connection for all of the other saturation windings devoted to the control of the primary circuit of the motor 1, this being accomplished by a return lead 74 which joins at one end with the winding 70 and at the opposite end with a cross connecting lead 75 which is connected as shown to output terminals of the rectifiers 38 and 49. By reason of the unidirectional conductivity of the said rectifiers 38 and 49 the single return lead 74 is sufficient for the purpose as will be more fully explained hereinafter.

In normal operation at the outset the flux diverting arm 76 of the induction regulator 42 will be in mid or vertical position and neither of the windings 39 nor 46 will be excited. If the operator chooses to deflect the arm 76 to the position shown in the drawing winding 39 becomes excited and the rectifier 38 becomes a source of direct current potential. When this occurs, saturation reactors 13, 31, 22, 65, 66 and 67 become saturated and their corresponding reactor coils 11, 29, 20, 62, 63 and 64 are deprived of their normally high impedance. This permits power to be admitted from the mains 4, 5 and 6 to the terminals 16, 25 and 7 respectively. The motor 1 being thus supplied with power tends to accelerate. At the outset of this acceleration there is little impedance in the windings 62, 63 and 64 by reason of the more or less complete saturation of the magnetic material with which they are associated. Large secondary currents are thus permitted to flow to provide a large starting torque if desired and the motor 1 accelerates and behaves in a manner comparable to that of a squirrel cage motor. If the arm 76 of the induction regulator 42 were thrown to the extreme opposite position an entirely comparable situation would exist except that the motor 1 would be driven in the opposite direction. Complete reversability of the motor 1 without resort to any switching is thus provided.

If regulation of the output of the motor 1 is desired, the arm 76 of the regulator 42 is moved to an appropriate intermediate position between its mid position and the position shown. When this occurs, incomplete saturation of saturation reactors 13, 31, 21, 65 and 67 is provided and their corresponding reactor coils exhibit a corresponding impedance. This causes a limitation to be placed upon the voltage applied to the primary windings of the motor 1 and furthermore at the outset of acceleration there is interposed an equivalent resistance in the secondary circuit somewhat less than the resistance of resistors 57, 58 and 59. As acceleration of motor 1 progresses, the frequency of secondary current diminishes and without any alteration of the position of the arm 76 the effect of secondary resistance diminishes accordingly. This permits the starting of motor 1 with a moderate inrush of starting current and furthermore permits speed regulation of motor 1 steplessly over a wide range.

Saturation reactors 30 and 31, while not essential to some of the objectives to be accomplished, serve to maintain complete balance in the primary circuit of motor 1 throughout the range of regulation of power input. They play no part, however, in the reversability function which is performed entirely by the saturation reactors 12 and 21 on the one hand and 13 and 22 on the opposite hand. It is also possible to dispense with the regulating circuit elements in the secondary circuit and to employ, if desired, a squirrel cage rotor in place of the wound rotor 3. In such an arrangement complete reversability is preserved and some measure of speed control might also be obtained depending upon the character of the load imposed upon the motor 1.

The secondary circuit of the apparatus shown in the drawing may also be rearranged to cooperate with other well known speed regulating arrangements, such as, cascading or concatenation arrangements either direct or differential or both. For example, if the resistors 57, 58 and 59 are replaced by or regarded as being the stator windings of a squirrel cage motor, the shaft of which is mechanically coupled with the shaft upon which rotor 3 is mounted, then a cascading system is established which calls for full speed operation when saturation reactors 65, 66 and 67 are excited and half speed operation when the same are not excited. With such an arrangement it may be desirable to control the excitation of saturation reactors 65, 66 and 67 independently or semi-independently of the control of saturation reactors 13, 31, 22 and 12, 30, 21. This can be easily accomplished by providing an additional variably supplied rectifier for furnishing excitation current to the saturation reactors 65, 66 and 67. In like manner other variable speed motor arrangements such as the spinner type motor having an intermediate rotor may be steplessly regulated without resort to switches by application of the invention herein disclosed.

I claim:

1. In a reversible three phase induction motor the combination comprising a stator having three primary windings and three terminals, a rotor, a first forward and a first reverse saturation reactor impedance windings connected at one end of each to one another and to a first terminal of said motor the opposite ends of said windings being adapted for connection respectively to a first and a second line of a three phase power supply, a second reverse and a second forward saturation reactor windings connected at one end of each to one another and to a second terminal of said motor the opposite ends of said windings being adapted for connection respectively to said first and second lines of said three phase power supply, third forward and reverse saturation reactor windings connected at one end of each to one another and to the third terminal of said motor the opposite ends of said windings being joined and adapted for connection with the third line of said three phase power supply, said forward saturation reactor windings being provided with a set of magnetic field frames interlinking the same and said reverse saturation reactor windings being provided with a set of magnetic field frames interlinking the same distinct from the field frames of said forward saturation reactor windings, forward excitation means including excitation windings interlinking said forward saturation reactor field frames adapted to alter the degree of saturation of the fields of said forward saturation reactors simultaneously, and reverse excitation means including windings interlinking said reverse saturation reactor field frames adapted to alter the degree of saturation reactors simultaneously, said excitation means being adapted to be activated alternatively whereby phase sequence of current supplied to said motor may be inverted without unbalance of phase loading, there being further provided as a source of excitation current for said forward and reverse excitation means an inductive regulator having a field frame, a primary winding adapted to be supplied with alternating current and forward and reverse secondary windings interlinking said field frame, a movable core means mounted on said field frame movable to establish coupling between said primary winding and said forward secondary winding only when in one position and between said primary winding and said reverse secondary winding only when in another position, a forward rectifier connected to said forward secondary winding to be supplied with current therefrom and connected at its output with said forward excitation means, and a reverse rectifier connected to said reverse secondary winding to be supplied with current therefrom and connected at its output to said reverse excitation means.

2. In an apparatus in accordance with claim 1 wherein the motor rotor is wound providing a secondary motor circuit, saturation reactor means having reactance windings in circuit with the secondary circuit of said motor and saturation windings, a connection joining one output terminal of the forward rectifier with an output terminal of like polarity of the reverse rectifier and joining the two said output terminals to one end of said saturation windings, and circuit means joining the remaining end of said saturation windings to the remaining output terminals of said rectifiers.

References Cited in the file of this patent
UNITED STATES PATENTS

| | | |
|---|---|---|
| 808,944 | Porter et al. | Jan. 2, 1906 |
| 1,713,223 | Green | May 14, 1929 |
| 1,844,704 | Thompson | Feb. 9, 1932 |
| 1,955,322 | Brown | Apr. 17, 1934 |
| 2,228,078 | Gulliksen | Jan. 7, 1941 |
| 2,379,146 | Griscom | June 26, 1945 |
| 2,384,864 | Wickerham | Sept. 18, 1945 |
| 2,384,865 | Wickerham | Sept. 18, 1945 |
| 2,411,608 | Lesnick | Nov. 26, 1946 |
| 2,440,319 | Wickerham | Apr. 27, 1948 |
| 2,559,538 | Jacobs | July 3, 1951 |
| 2,676,292 | Spencer | Apr. 20, 1954 |